United States Patent
Johnson et al.

(10) Patent No.: US 9,634,461 B1
(45) Date of Patent: Apr. 25, 2017

(54) GEOMETRIC ISOLATOR PROVIDING ISOLATION BETWEEN RESONANTLY PUMPED CASCADED LASER

(71) Applicant: BAE Systems Information And Electronic Systems Integration Inc., Nashua, NH (US)

(72) Inventors: Benjamin R Johnson, Nottingham, NH (US); Daniel J Creeden, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/810,930

(22) Filed: Jul. 28, 2015

Related U.S. Application Data

(60) Provisional application No. 62/035,085, filed on Aug. 8, 2014.

(51) Int. Cl.
| | |
|---|---|
| *G02B 6/26* | (2006.01) |
| *H01S 3/23* | (2006.01) |
| *H01S 3/067* | (2006.01) |
| *H01S 3/00* | (2006.01) |
| *G02B 6/27* | (2006.01) |
| *G02B 6/42* | (2006.01) |

(52) U.S. Cl.
CPC .......... *H01S 3/2316* (2013.01); *G02B 6/2746* (2013.01); *H01S 3/0064* (2013.01); *H01S 3/067* (2013.01)

(58) Field of Classification Search
CPC . H01S 3/06733; H01S 6/06737; G02B 6/268; G02B 6/14; G02B 2006/12157
See application file for complete search history.

(56) References Cited

U.S. PATENT DOCUMENTS

| | | | | |
|---|---|---|---|---|
| 5,566,196 | A * | 10/1996 | Scifres | G02B 6/02042 |
| | | | | 372/6 |
| 6,477,295 | B1 * | 11/2002 | Lang | G02B 6/2817 |
| | | | | 372/6 |
| 7,184,623 | B2 * | 2/2007 | Cai | G02B 6/262 |
| | | | | 359/333 |
| 7,336,858 | B1 | 2/2008 | Moore | |
| 7,768,700 | B1 * | 8/2010 | Savage-Leuchs | B29C 47/0026 |
| | | | | 359/341.1 |
| 8,102,885 | B2 * | 1/2012 | Peyghambarian | H01S 3/067 |
| | | | | 372/6 |
| 8,270,445 | B2 * | 9/2012 | Morasse | G02B 6/03616 |
| | | | | 372/40 |

(Continued)

*Primary Examiner* — Rhonda Peace
(74) *Attorney, Agent, or Firm* — Joseph E. Funk; Scott J. Asmus

(57) ABSTRACT

A fiber optic geometric isolator is disclosed which is inserted between two cascaded, high-power fiber optic lasers and, in conjunction with a cladding mode stripper, provides improved optical Isolation between the two fiber optic lasers while maintaining highly-efficient laser operation. The isolator achieves this without the need for electromagnetic isolation between the two cascaded lasers. The isolator is an optical fiber designed to operate as a monolithic, continuous waveguide to enable a specific mode-coupling condition that converts the light of a first laser to that of a second, cascaded laser, with the light moving from the core of the first laser to both the core and the cladding of the second laser.

7 Claims, 3 Drawing Sheets

(56) References Cited

U.S. PATENT DOCUMENTS

| | | | |
|---|---|---|---|
| 8,433,161 B2 | 4/2013 | Langseth | |
| 8,767,286 B2* | 7/2014 | Savage-Leuchs | G02B 6/02009 359/341.1 |
| 8,818,151 B1* | 8/2014 | Ward | G02B 6/264 264/1.28 |
| 2006/0171631 A1* | 8/2006 | Deng | G02B 6/421 385/28 |
| 2006/0187540 A1* | 8/2006 | Andrejco | H01S 3/06716 359/341.5 |
| 2008/0267560 A1* | 10/2008 | DiGiovanni | G02B 6/14 385/28 |
| 2011/0249321 A1* | 10/2011 | Savage-Leuchs | G02B 6/02009 359/341.3 |
| 2011/0305251 A1* | 12/2011 | Tanigawa | G02B 6/02033 372/6 |
| 2012/0170889 A1* | 7/2012 | Kato | G02B 6/12 385/28 |
| 2015/0085351 A1* | 3/2015 | Fontaine | H01S 3/094065 359/341.3 |
| 2015/0249311 A1* | 9/2015 | Rowen | H01S 3/0064 359/337 |
| 2016/0164244 A1* | 6/2016 | Gapontsev | H01S 3/06729 372/6 |

* cited by examiner $$I \text{ (db)} = 10 \text{ Log} \left( \left( \frac{a_1}{a_2} \right)^2 \left( \frac{NA_1}{NA_2} \right) \right)$$

GEOMETRIC ISOLATOR PROVIDING ISOLATION BETWEEN RESONANTLY PUMPED CASCADED LASER

This application claims the benefit of Provisional Application No. 62/035,085, filed Aug. 8, 2014.

FIELD OF THE INVENTION

The invention relates to isolators for isolating resonantly pumped cascaded fiber optic lasers.

BACKGROUND OF THE INVENTION

Advances in the field of fiber optic lasers have been rapid and such lasers have been integrated into the industrial and manufacturing sectors. The achieved power levels of fiber optic lasers have grown rapidly to output power levels exceeding 10 kW for 1 μm lasers. Power levels of 2 μm lasers area also growing with output power levels expected to exceed 10 kW within the near future.

Fiber optics presents a unique challenge in cascaded laser architectures due to the waveguide-nature of the fiber. Since the light is confined to a specific geometric shape and readily propagates long distances in both axial directions, efficient coupling between two fiber lasers is often simple to achieve. This is an advantage for efficient, low-loss laser operation but presents a problem in the case of laser back reflections. Cascaded fiber optic lasers, and particularly cascaded high power fiber optic lasers, have a problem with back reflections from a second laser into a first laser that drives the second laser. This destabilizes laser operation and results in degradation of many laser properties such as emission wavelength and output power in the first laser. With high power lasers this can be catastrophic and lead to the destruction of the first laser.

Isolation between cascaded lasers is necessary for uncoupled, stable operation of each laser in turn. Current attempts at optical isolation in fiber lasers are essentially miniature mimics of their solid state devices. The input and output fibers within these devices launch into or out of free space to interact with an optical material providing directional isolation. These devices typically result in insertion losses on the order of 1 dB, or about 20%; which is unacceptable in high power laser operation.

Such insertion losses can be minimized in high power laser applications using existing optical isolation techniques between cascaded fiber lasers. However, these existing techniques of optical isolation introduce complexity and cost to cascaded, high power, fiber laser systems. They require heavy magnets, polarizing elements, and robust, Faraday rotator materials or expensive, precision optical coatings that lead to large package sizes, often prohibitively high losses (as high as 5 dB) and high costs in the order of several thousands of dollars. Additionally these prior art techniques of isolation are limited in power handling capacity due to the very strong electric fields and high intensities associated with high power laser beams.

The short-falls of existing fiber-based isolator technology have driven significant research into the development of an all-fiber isolator. Current all fiber isolators are fiber analogs of a solid state laser. Chirally coupled cores serve as polarizers and a rare-earth doped fiber, in conjunction with a large magnet, perform the Faraday rotation. These devices exploit the same phenomena as the solid state analogs and carry the same inherent weaknesses as the existing technology in addition to incorporating the weaknesses of optical fibers such as high core intensities.

In-the-fiber isolators are actually free-space devices manufactured on millimeter-scale, are limited in power handling (typically <50 watt) and incur excess loss. Such high power, pure fiber isolators are still subjects of research and development and are not widely used in the high power laser industry.

Another major source of optical coupling loss is geometrical. As an example, two fibers coupled end-to-end may not be precisely aligned, with the result that the two cores overlap somewhat. Light exiting the source fiber at a portion of its core that is not aligned with the core of the receiving fiber will not (in general) be coupled into the second fiber. While some such light will be coupled into the second fiber, it is not likely to be efficiently coupled, nor will it generally travel in an appropriate mode in the second fiber.

Very briefly, what is needed in the art is efficient, relatively inexpensive, strong optical Isolation between two fiber optic lasers while maintaining highly-efficient laser operation.

SUMMARY OF THE INVENTION

We have solved the above described problem in the prior art of coupled cavity destabilization in monolithic, resonantly-pumped, double-clad, fiber optic lasers. The uniqueness of the invention lies in the simplicity by which strong optical Isolation is established between two cascaded, high power fiber optic lasers while maintaining highly-efficient laser operation. This is accomplished by using a geometrical isolation as part of a novel, simplified, optical isolator coupler between two cascaded lasers.

One advantage is that the geometrical isolation permits high-power, power scaling to be achieved without the need for electromagnetic isolation between monolithic, double-clad fiber-lasers that comprise the two cascaded lasers. In addition, the geometrical optical isolation is achieved using a fiber optic waveguide designed as a brightness converter that bi-directionally decreases brightness, which in combination with a cladding mode stripper, provides a high degree of optical isolation between the cascaded laser stages in high power optic lasers.

More particularly, the invention solves the above described problems of the prior art by exploiting the brightness conversion of optical pump radiation passing from a first laser into a second, cascaded laser. The brightness conversion is particularly important in double clad fiber lasers because cladding-pumping has significant thermal advantages over core-pumped architectures. The diameter of the core in the first laser is significantly smaller than the diameter of the core of the geometric isolator so all light energy from the core of the first laser is input to the core of the geometric isolator. The diameter of the core in the second laser is also significantly smaller than the diameter of the core of the geometric isolator. As light from the first laser that has passed through the core of the geometric isolator passes into the core of the second laser the brightness into the core is decreased because a significant amount of the light is guided into the cladding layer of the second laser, becoming cladding-radiation. This decreases the thermal stress on the core of the second laser. This brightness reduction in the core of the second laser is caused by the above described geometric mismatch between the diameters of the cores of the geometric isolator and the second laser. There are a number of prior art methods to achieve cladding-coupling of core-radiation including, but not limited, to side-coupling and tapered fiber bundles. These methods result in poor optical isolation between the pump laser (first laser) and the cascaded laser(s)(second laser). The invention simultaneously provides a very efficient (<<1 dB) method of brightness conversion and effective isolation (~20 dB depending on fiber architectures) between cascaded fiber lasers. In addition, the invention is implemented in a monolithic fashion that maintains many of the advantages inherent in fiber lasers which are compact packaging, no optical alignment, and environmental in-sensitivity.

Stated another way, the invention has optical fibers specifically designed to enable a specific mode-coupling condition or specific mode-coupling conditions that convert the light of one laser to that of a second laser, as the light moves from the core of the one laser to the core and cladding of the second laser. This is done using a short piece of intermediary fiber optic operating as a monolithic, continuous, fiber optic cable waveguide to achieve isolation. The present invention utilizes specifically designed fibers such that a desired level of geothermic isolation is achieved between the two lasers without the use of electromagnetic manipulation of the light guided by a fiber optic cable, not operating as an oscillator, but joining two or more lasers. The present invention has light conversion within the single optical fiber joining two lasers for the purposes of isolating and/or pump-coupling radiation from a pump fiber laser to a signal fiber laser using the same or compatible dopants in the active gain fiber in the respective fiber lasers. The light conversion within a single optical fiber may also have dopants that share a common spectral gain region.

DESCRIPTION OF THE DRAWINGS

The invention will be better understood upon reading the following Detail Description in conjunction with the drawing in which.

DETAIL DESCRIPTION

The invention is a monolithic fiber optic waveguide that is described herein as a geometric isolator 13 providing necessary isolation between a first and a second fiber-optic laser (11,14). Accordingly, the term geometric isolator 13 is used in the following detailed description. In an alternative embodiment of the invention the fiber optic waveguide functions as a geometric coupler rather than in isolator.

Figure 1:
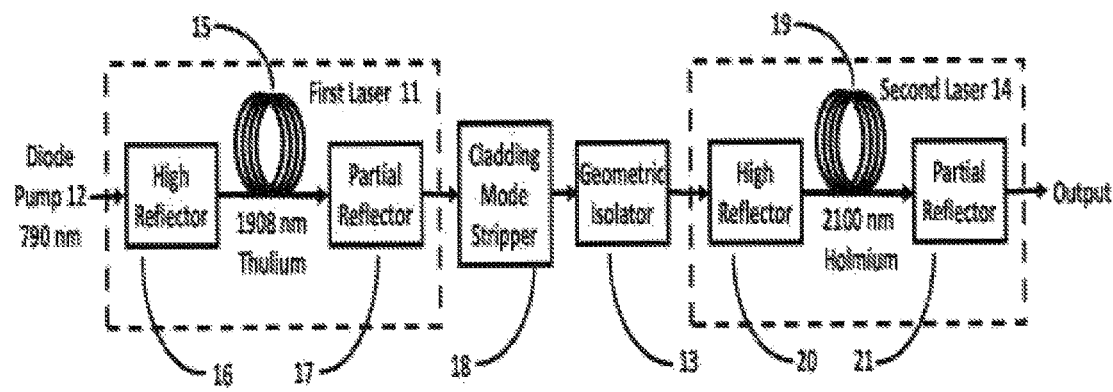
FIG. 1 is a block diagram of the invention showing the output of a first laser driving a second laser with a novel geometric isolator between the two lasers.

FIG. 1 is a block diagram of a preferred embodiment of the invention showing the output of a first fiber optic laser 11 driving a second fiber optic laser 14 with a cladding mode stripper 18 and a novel geometric isolator 13 between the two lasers providing the necessary isolation between first laser 11 and second laser 14. First laser 11 comprises a conventional fiber optic cable 15 having a core and cladding and the core is Thulium doped and provides an output at 1908 nanometers. In a conventional manner a high reflector 16 is connected to the input end of cable 15 and a partial reflector 17 is connected to the output end of cable 15. Cable 15 is the oscillating portion of first laser 11. For use with the novel geometric isolator 13 to provide the desired isolation between lasers 11 and 14 there is a cladding mode stripper 18 that is a one to two meter length piece of fiber-optic cable connected to the output side of partial reflector 17 of laser 11. This short piece of fiber optic cable 18 is prepared in a conventional manner to operate as a cladding mode stripper 18. Cladding mode stripping is known in the art and is used to remove light from the cladding layer of the piece of fiber-optic cable comprising stripper 18. Its specific use in the operation of the present invention is described in detail further herein.

Fiber optic laser 11 is pumped by a pump diode laser 12 that outputs coherent light at 790 nanometers. The coherent light output from pump diode 12 passes through high reflector 16 and pumps thulium doped fiber optic cable 15 to oscillate at 1908 nanometers.

The 1908 nanometer coherent light output from cable 15 passes through partial reflector 17, then through cladding mode stripper 18 and is input to and passes through the larger diameter core of geometric isolator 13 which is described in detail hereinafter with reference to FIG. 2. Isolator 13 creates the desired geometric mismatch that provides the necessary optical geometric isolation between first laser 11 and second laser 14. Such isolation is usually accomplished in a more complex and costly manner. More specifically, geometric isolator 13 cooperates with cladding mode stripper 18 to prevent feedback of any back propagating, reflected light from second laser 14 to either the core 38 or cladding 37 of fiber-optic cable 15 of first laser 11. This is required because such back propagating of reflected signal light from second laser 14 may be amplified in first laser 11 and cause serious damage to laser 11 and/or its pump diode 12. Isolator 13 functioning with cladding mode stripper 18 blocks the back propagation of coherent light generated by second laser 14 to first laser 11 by creating a gross geometrical decoupling of lasers 11 and 14 via core and numerical mismatches. The gross geometrical decoupling occurs due to the extreme differences in the diameter of the cores of lasers 11 and 14, cladding mode stripper 18 and geometric isolator 13 as is shown in and described with reference to FIG. 2.

For the embodiment of the invention described herein, geometric isolator 13 is a 1 meter long piece of fiber-optic cable having a core 24 and one cladding layer 25. The core 24 is doped using dopants such as germanium, fluorine, boron and other dopants. In the embodiment of the invention described herein the dopant is germanium. Without any input and output reflectors the fiber optic cable of geometric isolator 13 does not oscillate.

The 1908 nanometer coherent light generated by first laser 11 passes through cladding mode stripper 18 and is output from geometric isolator 13. This light pumps both the core 26 and enter cladding layer 27 of Holmium doped second laser 14 which generates coherent light at 2100 nanometers. Second laser 14 comprises a double cladding fiber optic cable 19 having a core 26, a first cladding layer 27, a second cladding layer 41 and a core 26 which is doped with Thulium or Holium, and is doped with Holmium in the embodiment of the invention described herein to generate the coherent light output from laser 14 at 2100 nanometers. In a conventional manner a high reflector 20 is connected to the input end of cable 19 and a partial reflector 21 is connected to the output end of cable 19.

In particular, the present invention is useful where the second fiber laser 14 is resonantly pumped by first fiber laser 11, i.e. Thulium pumped Thulium, or when the gain fibers between the two lasers 11 and 14 share a common spectral gain region, i.e. a Thulium pumped Homium laser, or a Ytterbium pumped Neodymium laser. These types of optical pumping schemes are very sensitive to optical feedback because any back-propagating signal light from second laser 14 that is coupled back to the core 38 or the cladding 37 of first laser 11 may be amplified in first laser 11 causing damage thereto or to its pump diode 12. The geometric isolator 13, with its gross geometrical mismatch, is a highly effective, optical isolator for double clad pumping schemes in these types of cascaded lasers.

In both the first laser 11 and the second laser 14 the index of refraction of the core is greater than the index of refraction of the inner cladding layer, which is in turn is greater than the index of refraction of the outer cladding layer, which is in turn is greater than the index of refraction of the outer cover (not shown).

Figure 2:
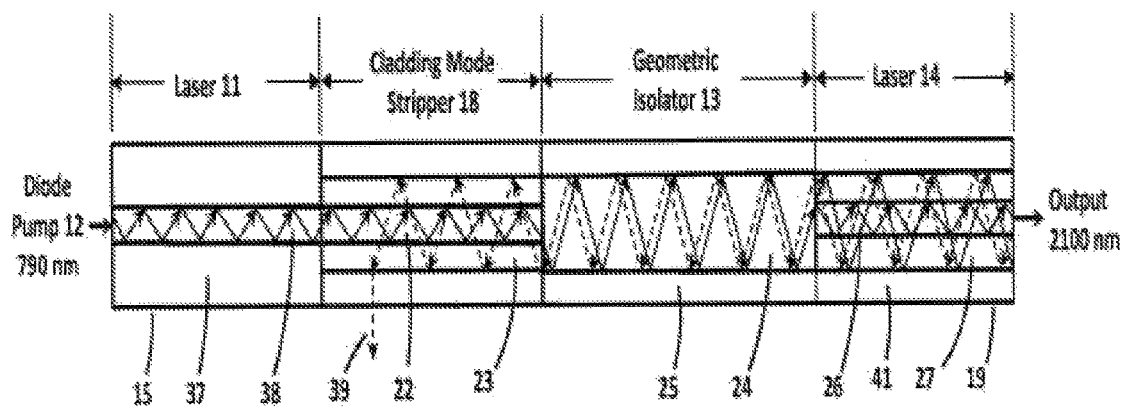
FIG. 2 is a pictorial diagram of the size (diameter) relationships of the core and claddings of first laser 11, geometric isolator 13, second laser 14 and cladding mode stripper 18.

FIG. 2 is a pictorial diagram of the size (diameter) relationships of the cores and claddings of first laser 11, cladding mode stripper 18, geometric isolator 13 and second laser 14. This figure best illustrates the uniqueness and simplicity of the invention by which strong optical Isolation is established between the two cascaded, high power fiber optic lasers 11 and 14 while maintaining highly efficient laser operation. The isolation is accomplished by using the geometric isolation between lasers 11 and 14 implemented by geometric isolator 13 with its large geometric mismatches and cladding mode stripper 18. For the sake of simplicity only, the required reflectors 16, 17, 20 and 21 shown in FIG. 1 are not shown in FIG. 2.

in FIG. 2 it can be seen that the diameter of core 38 of first laser 11 and the diameter of core 22 of cladding mode stripper 16 are the same but are much less than the diameter of core 24 of the piece of fiber-optic cable comprising geometric isolator 13. It can also be seen that the diameter of core 26 of the second laser 14 is also much less than the diameter of core 24 of the piece of fiber-optic cable comprising geometric isolator 13, and the diameter of core 22 of first laser 11 is preferably the same as the diameter of core 26 of second laser 14, but need not be so. The outside diameter of first laser 11, geometric isolator 13 and second laser 14 are preferably the same in the preferred embodiment of the invention, as seen in FIG. 2, but need not be so.

The core 38 of cable 15 of first laser 11 is pumped by the 790 nm light output from its diode pump 12 to generate coherent 1908 nm light from Thulium doped fiber optic cable 15. The 1908 nanometer light generated by first laser 11 exits core 38 of cable 15 and passes into core 22 of cladding mode stripper 18. The 1908 nm light is shown by the solid lines with arrowheads inside the core 38 of laser 11 and inside core 22 of cladding mode stripper 18. The arrowheads represent the direction of transmission of the light through cores 22 and 38. The direction of the arrow heads anywhere in FIGS. 2, 6 and 7 also only represent the direction of transmission of the light in the fiber-optic cables. The diameter of core 38 and core 22 are preferably the same but the diameter of core 24 in cladding mode stripper 18 is deliberately much larger to create the aforementioned gross geometric mismatch. After the coherent light generated in the core 38 of cable 15 of first laser 11 passes through the core 22 of cladding mode stripper 18 the 1908 nm light is input to the much larger diameter core 24 of geometric isolator 13. Because the diameter of core 22 of first laser 11 is deliberately so much smaller than the core 24 of geometric isolator 13 there is no typical alignment problems and no 1908 nm light is inadvertently coupled to the cladding layer 25 of geometric isolator 13. In addition the brightness of the light and isolator 13 is reduced because it is spread over a greater area.

There are no reflectors incorporated within geometric isolator 13 so its core 24 does not oscillate and the 1908 nm signal input thereto from first laser 11 passes through the core 24 of isolator 13 as shown by the solid lines with arrowheads. Because the diameter of core 24 of isolator 13 is so much larger than the diameter of core 26 of second laser 14 the 1908 nm light output from core 24 of isolator 13 is input to both core 26 and cladding 27 of second laser 14, and, due to the ratio of the cross-sectional area of the core 26 and cladding 27, most of the 1908 nm light is input to cladding layer 27. This greatly decreases the brightness of the light entering core 26. The core 26 of second laser 14 is thereby driven and oscillates at 2100 nm. In addition, the 1908 nm light input to cladding 27 of second laser 14 also cladding pumps core 26 in a manner known in the art. This eliminates prior art problems of just trying to pump second laser 14 only at the input end of its core 26.

In the prior art coupling from the core of one fiber to the cladding of another fiber is generally performed using a splice where the cores of the two fibers are offset, or using a tapered coupler. Both these approaches present problems when operating at high power because minor splice losses can result in catastrophic laser failure. With the present invention there are no offset fibers or tapered couplers, and the coupling from the core of geometric isolator 13 to the cladding layer 27 of second laser 14 is much more efficient and is created by the gross geometric mismatch between diameter of the core 24 of isolator 13 and the much smaller diameter of the core 26 of second laser 14. Thus, the above described prior art problems are alleviated.

In a known manner there are 2100 nm light reflections within second laser 14, represented by the dashed lines, that travel back through geometric isolator 13 to cladding 23 and core 22 of cladding mode stripper 18 as shown. If too much of this back reflected 2100 nm light, as represented by the dashed lines with arrow heads representing back reflection, is allowed to reach first laser 11 it can pump first laser 11 to the point where damage is done to laser 11 and to its diode pump 12. Again, the geometric mismatch between the dimensions of the core and cladding of double clad, cladding mode stripper 18 and of geometric isolator 13 creates a gross geometrical decoupling of lasers 11 and 14 that prohibits most of the back reflected light from second laser 14 from reaching first laser 11.

As previously mentioned the back reflected 2100 nm light must be eliminated to prevent damage to laser cable 15 and its diode pump laser 12. Even small back reflections from second laser 14 that reach cable 15 can destabilize laser operation in first laser 11 resulting in degradation of many laser properties such as emission wavelength and output power. This is a very undesirable condition and is avoided as much as possible using optical isolation between the cascaded lasers. This is the function of cladding mode stripper 18 operating in conjunction with the large diameter core of geometric isolator 13 to assure that most of the back reflected light from second laser 14 is in cladding 23 of stripper 18 and is thereby removed by cladding mode stripper 18. The combination of geometric isolator 13 and the cladding mode stripper 18 connected to the output of first laser 11 jointly provide sufficient optical isolation that any back reflected light from second laser 14 that reaches first laser 11 does not adversely affect the operation of laser 11. This happens because the cross-sectional area of first cladding layer 23 is so much greater than the cross-sectional area of core 22 in cladding mode stripper 18. There is a small amount of back radiation that passes back through core 22 of stripper 18 to the core 38 of first laser 11 but it is so small that the operation of laser 11 is not detrimentally affected.

More particularly, the back reflected 2100 nm light from laser 14 enters the cladding layer 23 of cladding mode stripper 18 and, in a manner known in the art, is removed at exit 24. Thus, no damage is done to core 38 of cable 15 of first laser 11 and its 790 nm diode pump 12. In addition, due to the gross geometrical mismatch the invention provides a very efficient (significantly less than 1 dB) method of brightness conversion and effective isolation (approximately 20 dB, depending on fiber architectures) between cascaded fiber lasers 11 and 14. Further, with the invention being implemented in a monolithic fashion it maintains many of the advantages inherent in fiber lasers (ex. compact packaging, no optical alignment, environmental insensitivity).

In summary, optical isolation between lasers 11 and 14 is achieved using two methods: geometrical mismatching and evanescent out-coupling of radiation in the cladding mode stripper 18. The isolation provided by the geometric mismatch is on the order of existing single stage isolators (approximately 20 dB). This isolation provides the desired geometry of coupling light from the core of one fiber to the cladding of the next fiber as previously described with reference to laser 14. Further isolation on the order of approximately 20 dB is added to the system by incorporating a cladding mode stripper 18 designed to remove the light back reflected from second laser 14 into first laser 11. The back reflected light from second laser 14 into the cladding 23 of cladding mode stripper 18 allows for easy removal of the back reflected radiation via evanescent coupling.

Figure 3:
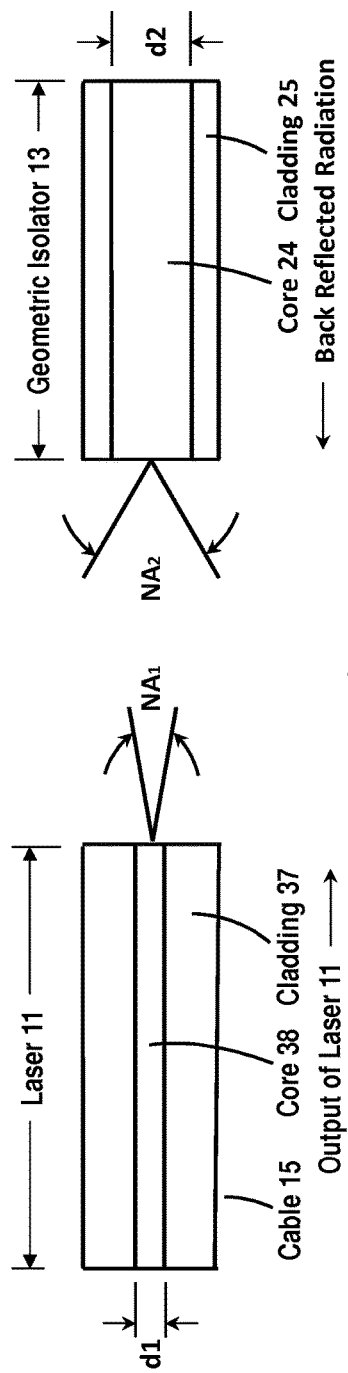
FIG. 3 is a pictorial diagram showing the numerical apertures NA of elements of the invention.

FIG. 3 shows cross-section of first fiber optic cable 15 of laser 11 having a core 38 with a diameter d1 and a cladding layer 37 and its numerical aperture is designated $NA_1$. FIG. 3 also shows a second fiber-optic cable, that of the geometric isolator 13, having a core 24 with a diameter of d2 and a cladding layer 25 and its numerical aperture is designated $NA_2$. The numerical aperture (NA) of fiber-optic cables is dependent upon the diameter and shape of the core of fiber optic cables. The numerical aperture of fiber-optic cables is used in the calculation of the isolation introduced by a geometric isolator 13 when using the equation shown in and described hereinafter with reference to FIG. 4.

Figures 4, 5:
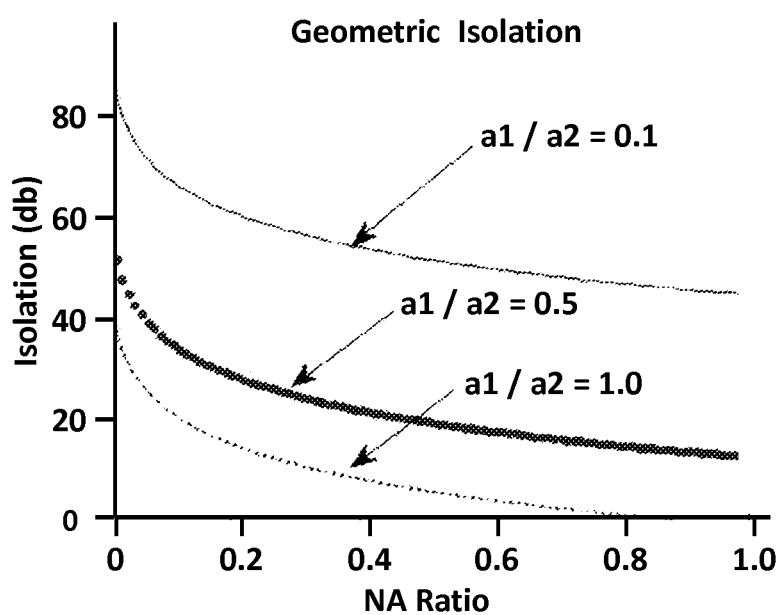
FIG. 4 is an equation defining the relationship between numerical apertures, core size ratios and the isolation that can be achieved using a geometric isolator in accordance with the teaching of the invention.
FIG. 5 is a graph relating the elements in the equation shown in FIG. 4.

The total isolation introduced by geometric isolator 13 depends on the properties of the fiber optic cables (numerical aperture (NA) and core and cladding sizes) of (1) the cladding mode stripper 18, (2) the geometric isolator 13, and (3) the input fiber to second laser 14, and can be calculated using the equation shown in FIG. 4. In this equation $(a_1/a_2)$ represent the core size ratio, and $(NA_1/NA_2)$ represent the numerical aperture (NA) ratio. The values that are input into the equation shown in FIG. 4 are measured at the interface of cladding mode stripper 18 and geometric isolator 13. A chart showing the isolation measured in decibels achieved as a function of core size ratio (a1/a2) and numerical aperture ratio (NA1/NA2) is shown in the graph in FIG. 5 and is further described in the next paragraph.

In FIG. 5 is shown a graph of the geometric isolation achieved by the present invention in terms of the isolation achieved measured in decibels for different numerical aperture (NA) ratios for different values of the core size ratio (a1/a2). It can be seen from this graph that for a particular numerical aperture ratio (NA1/NA2) as the core size ratio (a1/a2) decreases the achieved isolation in decibels increases.

The fiber cable used as a geometric isolator 13 may be used as a geometric coupling device to join a pump laser to a non-linear fiber optic converter, such as but not limited to, a cladding-pumped Raman fiber laser. These non-linear fiber optic devices enable users to generate radiation in spectral regions not available via direct emission from rare-earth doped lasers, i.e. 1.7-1.85, μm. This is more particularly shown in and described below with reference to FIGS. 6 and 7.

Figure 6:
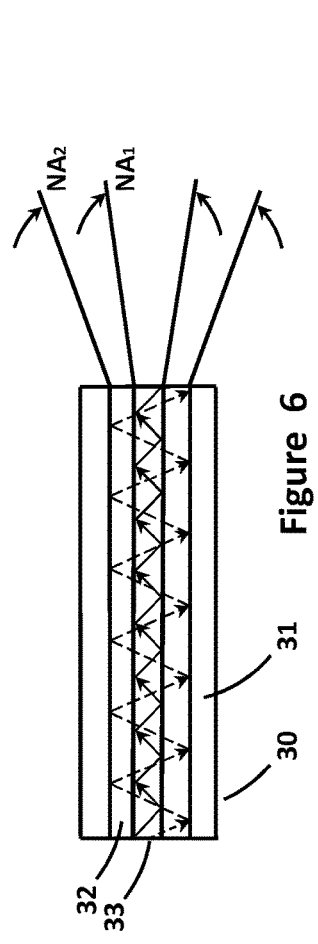
FIG. 6 is a pictorial diagram showing the relationship between the diameter of cores of fiber-optic cables and their numerical apertures.
Figure 7:
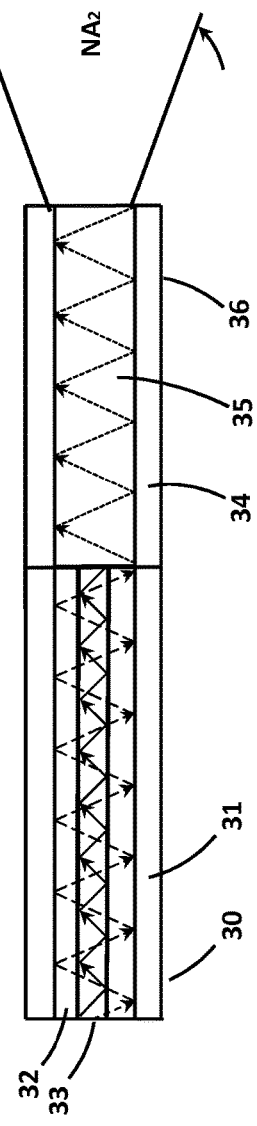
FIG. 7 is a pictorial diagram showing the use of the fiber optic cable of the geometric isolator to combine light from a fiber-optic core and its cladding layer, each having a different numerical aperture, into a single light beam having a common numerical aperture.

FIG. 6 shows a fiber-optic cable 30 having a core 33 surrounded by a first cladding layer 32, and a second cladding layer 31. The numerical aperture of the core 33 is $NA_1$ and the numerical aperture of the inner cladding layer 32 is $NA_2$ and is also shown in FIG. 7. This is a representation of fiber-optic cable used in cladding mode stripper 18. It is obvious that the two numerical apertures are different. The light exiting a fiber laser with significant (approximately 10% or more) light guided by the cladding layer will exit at a greater angle than the core light as shown in FIG. 6.

Light escaping, or intentionally removed, from the core into the cladding of a fiber-optic laser is generally removed as scattered radiation or converted to heat. This is effectively a loss in laser efficiency. The collection of both core 33 light and cladding 32 light for use in a solid-state laser will result in two pump modes with a single oscillating mode in the solid-state laser. This modal-mismatch induces beam degradation and reduced laser efficiency in the solid-state laser. The Invention enables the effective recovery of lost cladding light for use in pumping another laser. More particularly, the invention permits recovering energy contained in higher order modes while homogenizing the numerical aperture divergence of the core and cladding light as shown in and described with reference to FIG. 7.

FIG. 7 shows more detail of how the invention is used as a geometric isolator 13 and as a geometric coupler 36 to eliminate detrimental modal-mismatch. The use as a geometric isolator 13 is described in the following paragraph. The use as a geometric coupler 36 provides a method of optical coupling in high power applications where the coupling geometry efficiently guides light coming from both the core and cladding of one fiber 30 into a single beam having a numerical aperture $NA_2$ which is used as appropriate. More specifically the geometric coupler 36 receives light into both core 33 and cladding layer 32 and combines their energy into a single beam having a common numerical aperture $NA_2$ as shown in FIG. 7. This is advantageous because this increases the total pump energy available to pump a solid-state laser while simplifying any beam conditioning optics. In the prior art, coupling from the core of one fiber to the cladding of another fiber is generally performed using a splice with offset core or via a tapered coupler. These methods have problems when operating at high power because minor splice losses can result in catastrophic fiber-optic laser failure.

The above described advantages of beam coupling are utilized in the primary embodiment of the invention shown in FIG. 2. At second laser 14 reflected light in core 26 passes into core 24 of geometric isolator 13 at numerical aperture $NA_1$ and reflected light in cladding layer 27 passes into core 24 of geometric isolator 13 at numerical aperture $NA_2$. The two reflected lights are combined or homogenized into a single beam in core 24 of isolator 13 having a common numerical aperture $NA_2$ (as shown in FIG. 7) and the combined reflected beams enter cladding mode stripper 18 primarily at its inner cladding layer 23 and are removed at point 39 in a well known manner. Being at the numerical aperture value $NA_2$ most of the combined reflected light is in inner cladding layer 23 and is removed at 39. A small amount of the reflected light passing through core 22 of cladding mode stripper 18 enters core 38 of the first laser 11, but the brightness is low enough that it does not cause any problems in laser 11 due to amplification.

While what has been disclosed herein is the preferred embodiment of the invention and one alternative embodiment, those skilled in the art will recognize that numerous changes may be made without departing from the spirit and scope of the invention. Therefore, the present invention should not be limited to any single embodiment, but rather construed in breadth and scope in accordance with the recitation of the appended claims.

The invention claimed is:

1. An apparatus comprising:
 a first laser having a first core of a first diameter, and a first cladding layer surrounding said first core;
 a second laser having a second core of a second diameter, and a second cladding layer surrounding said second core;
 a geometric isolator connected between said first laser and said second laser, wherein said geometric isolator includes a third core of a third diameter, and a third cladding layer surrounding said third core, wherein said third diameter of said third core is significantly larger than said first diameter of said first core or said second diameter of said second core in order to generate a geometric mismatch between said first core and said second core for providing a geometric isolation between said first laser and said second laser; and
 a cladding mode stripper coupled on a first end to the first laser and coupled on a second end to the geometric isolator.

2. The apparatus of claim 1, wherein all laser light generated by said first laser exits said first core of said first laser and passes into and through said third core of said geometric isolator, wherein laser light exiting said third core of said geometric isolator is divided between said second core and said second cladding layer of said second laser.

3. The apparatus of claim 1, wherein said geometric isolation is determined by:

$$\text{Isolation} = 10\log\left[\left(\frac{d1}{d3}\right)^2\left(\frac{NA_1}{NA_3}\right)\right]$$

wherein d1=said first diameter, d3=said third diameter, $NA_1$=a numerical aperture of said first core, $NA_3$=a numerical aperture of said third core.

4. The apparatus of claim 1, wherein said third diameter of said core is substantially the same diameter as a diameter of said first cladding layer of said first laser.

5. The apparatus of claim 1, wherein said third diameter of said core is substantially the same diameter as a diameter of said second cladding layer of said second laser.

6. The apparatus of claim 1, wherein said core of said geometric isolator is doped with germanium.

7. The apparatus of claim 1, wherein said core of said geometric isolator is doped with fluorine.

* * * * *